United States Patent
Dou et al.

(10) Patent No.: US 9,150,004 B2
(45) Date of Patent: Oct. 6, 2015

(54) BIAXIALLY ORIENTED POLYLACTIC ACID FILM WITH IMPROVED HEAT SEAL PROPERTIES

(75) Inventors: Shichen Dou, Warwick, RI (US); Mark S. Lee, North Kingstown, RI (US); Keunsuk P. Chang, North Kingstown, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 21 days.

(21) Appl. No.: 12/814,802

(22) Filed: Jun. 14, 2010

(65) Prior Publication Data

US 2010/0323196 A1  Dec. 23, 2010

Related U.S. Application Data

(60) Provisional application No. 61/218,846, filed on Jun. 19, 2009.

(51) Int. Cl.

| | |
|---|---|
| B32B 27/08 | (2006.01) |
| B32B 27/18 | (2006.01) |
| B32B 27/36 | (2006.01) |
| B32B 37/15 | (2006.01) |
| C08L 67/02 | (2006.01) |
| C08L 67/03 | (2006.01) |
| C08L 67/04 | (2006.01) |
| C08L 23/08 | (2006.01) |
| C08G 63/02 | (2006.01) |
| C08G 63/08 | (2006.01) |
| C08G 63/12 | (2006.01) |
| C08G 63/123 | (2006.01) |
| C08G 63/127 | (2006.01) |
| C08G 63/16 | (2006.01) |
| C08G 63/18 | (2006.01) |
| C08G 63/181 | (2006.01) |
| C08G 63/183 | (2006.01) |
| B32B 38/00 | (2006.01) |

(52) U.S. Cl.
CPC ............... *B32B 27/18* (2013.01); *B32B 27/08* (2013.01); *B32B 27/36* (2013.01); *B32B 37/15* (2013.01); *B32B 2038/0028* (2013.01); *B32B 2250/02* (2013.01); *B32B 2250/03* (2013.01); *B32B 2250/24* (2013.01); *B32B 2250/244* (2013.01); *B32B 2250/40* (2013.01); *B32B 2307/30* (2013.01); *B32B 2307/31* (2013.01); *B32B 2307/518* (2013.01); *B32B 2307/702* (2013.01); *B32B 2307/704* (2013.01); *B32B 2307/7163* (2013.01); *B32B 2367/00* (2013.01); *C08G 63/02* (2013.01); *C08G 63/08* (2013.01); *C08G 63/12* (2013.01); *C08G 63/123* (2013.01); *C08G 63/127* (2013.01); *C08G 63/16* (2013.01); *C08G 63/18* (2013.01); *C08G 63/181* (2013.01); *C08G 63/183* (2013.01); *C08L 23/08* (2013.01); *C08L 23/0846* (2013.01); *C08L 23/0869* (2013.01); *C08L 67/02* (2013.01); *C08L 67/03* (2013.01); *C08L 67/04* (2013.01); *C08L 2201/06* (2013.01); *C08L 2203/16* (2013.01); *C08L 2203/162* (2013.01); *C08L 2205/02* (2013.01); *Y10T 428/24942* (2015.01); *Y10T 428/2826* (2015.01); *Y10T 428/31786* (2015.04)

(58) Field of Classification Search
None
See application file for complete search history.

(56) References Cited

U.S. PATENT DOCUMENTS

| | | | |
|---|---|---|---|
| 4,189,419 A | | 2/1980 | Takemoto et al. |
| 4,281,045 A | | 7/1981 | Sumi et al. |
| 4,310,578 A | | 1/1982 | Katsura et al. |
| 4,379,914 A | * | 4/1983 | Lundberg ............. 528/354 |
| 4,410,595 A | | 10/1983 | Matsumoto et al. |
| 4,464,438 A | | 8/1984 | Lu |
| 4,632,959 A | | 12/1986 | Nagano |
| 4,745,171 A | * | 5/1988 | Sato et al. ............. 528/116 |
| 4,828,920 A | | 5/1989 | Nakabayashi et al. |
| 4,877,685 A | | 10/1989 | Bergstrom et al. |
| 5,084,334 A | | 1/1992 | Hamano et al. |
| 5,108,807 A | | 4/1992 | Tucker |
| 5,147,726 A | | 9/1992 | Suzuki et al. |
| 5,153,074 A | | 10/1992 | Migliorini |
| 5,155,160 A | | 10/1992 | Yeh et al. |
| 5,175,054 A | | 12/1992 | Chu |
| 5,192,620 A | | 3/1993 | Chu et al. |
| 5,216,050 A | | 6/1993 | Sinclair |
| 5,352,716 A | | 10/1994 | Chapman et al. |
| 5,359,026 A | | 10/1994 | Gruber |
| 5,391,423 A | * | 2/1995 | Wnuk et al. .......... 428/217 |

(Continued)

FOREIGN PATENT DOCUMENTS

| | | |
|---|---|---|
| CA | 2239671 | 12/1999 |
| DE | 43 13 136 | 10/1994 |

(Continued)

OTHER PUBLICATIONS (2007) "Technology Focus Report: Toughened PLA," NatureWorks 1-5.

(Continued)

*Primary Examiner* — Vivian Chen
(74) *Attorney, Agent, or Firm* — Morrison & Foerster LLP

(57) ABSTRACT

Multi-layer biaxially oriented polylactic acid (BOPLA) film with a novel formulation improves the heat seal initiation temperature and heat seal performance of BOPLA films while maintaining good optical clarity. The film may include a core layer including polylactic acid base polymer resin, and a heat sealable layer including amorphous polylactic acid base polymer and a modifier comprising polycaprolactone or poly(butylene-adipate-co-butylene terephthalate).

29 Claims, No Drawings

(56) References Cited

U.S. PATENT DOCUMENTS

| | | | |
|---|---|---|---|
| 5,443,780 A | 8/1995 | Matsumoto et al. | |
| 5,444,107 A | 8/1995 | Ajioka et al. | |
| 5,473,439 A | 12/1995 | Pappas | |
| 5,484,881 A * | 1/1996 | Gruber et al. | 528/354 |
| 5,489,474 A | 2/1996 | Shinoda et al. | |
| 5,556,711 A * | 9/1996 | Ajioka et al. | 428/460 |
| 5,585,191 A * | 12/1996 | Gruber et al. | 428/480 |
| 5,631,066 A | 5/1997 | O'Brien | |
| 5,631,498 A | 5/1997 | Anschel et al. | |
| 5,731,093 A | 3/1998 | Chang et al. | |
| 5,849,374 A | 12/1998 | Gruber et al. | |
| 5,849,401 A | 12/1998 | El-Afandi et al. | |
| 5,908,918 A | 6/1999 | Chen et al. | |
| 5,939,467 A * | 8/1999 | Wnuk et al. | 523/128 |
| 6,005,068 A * | 12/1999 | Gruber et al. | 528/354 |
| 6,033,747 A | 3/2000 | Shiotani | |
| 6,080,478 A | 6/2000 | Karhuketo | |
| 6,096,431 A | 8/2000 | Matsudaira et al. | |
| 6,106,950 A | 8/2000 | Searle et al. | |
| 6,121,410 A | 9/2000 | Gruber et al. | |
| 6,143,408 A | 11/2000 | Fujita | |
| 6,153,276 A * | 11/2000 | Oya et al. | 428/35.2 |
| 6,171,714 B1 | 1/2001 | Bergkessel et al. | |
| 6,211,290 B1 | 4/2001 | Xiao et al. | |
| 6,248,430 B1 | 6/2001 | Toyoda et al. | |
| 6,312,823 B1 | 11/2001 | El-Afandi et al. | |
| 6,322,899 B1 | 11/2001 | Karhuketo et al. | |
| 6,326,440 B1 * | 12/2001 | Terada et al. | 525/411 |
| 6,350,530 B1 | 2/2002 | Morikawa et al. | |
| 6,353,086 B1 * | 3/2002 | Kolstad et al. | 528/354 |
| 6,444,750 B1 | 9/2002 | Touhsaent | |
| 6,472,081 B1 | 10/2002 | Tsai et al. | |
| 6,500,556 B1 | 12/2002 | Morris et al. | |
| 6,514,602 B1 | 2/2003 | Zhao et al. | |
| 6,521,336 B2 | 2/2003 | Narita et al. | |
| 6,543,208 B1 | 4/2003 | Kobayashi et al. | |
| 6,544,369 B1 | 4/2003 | Kitamura et al. | |
| 6,566,426 B1 | 5/2003 | Kanaida et al. | |
| 6,600,008 B1 | 7/2003 | Kobayashi et al. | |
| 6,649,103 B1 | 11/2003 | Bousmina et al. | |
| 6,649,732 B2 * | 11/2003 | Kobayashi et al. | 528/354 |
| 6,713,175 B1 | 3/2004 | Terada et al. | |
| 6,787,245 B1 | 9/2004 | Hayes | |
| 6,808,795 B2 * | 10/2004 | Noda et al. | 428/221 |
| 6,821,373 B1 | 11/2004 | Berlin et al. | |
| 6,841,597 B2 * | 1/2005 | Bastioli et al. | 524/47 |
| 6,844,077 B2 | 1/2005 | Squier et al. | |
| 7,067,596 B2 * | 6/2006 | Bastioli et al. | 525/444 |
| 7,070,803 B2 | 7/2006 | Skinhoj et al. | |
| 7,087,313 B2 * | 8/2006 | Sawai et al. | 428/480 |
| 7,112,356 B2 | 9/2006 | Nomula et al. | |
| 7,128,969 B2 * | 10/2006 | Busch et al. | 428/337 |
| 7,173,080 B2 * | 2/2007 | Yamada et al. | 524/445 |
| 7,175,917 B2 * | 2/2007 | Sukigara et al. | 428/480 |
| 7,195,822 B2 * | 3/2007 | Hiruma | 428/480 |
| 7,214,414 B2 | 5/2007 | Khemani et al. | |
| 7,223,359 B2 | 5/2007 | Torkelson et al. | |
| 7,235,287 B2 * | 6/2007 | Egawa | 428/212 |
| 7,285,318 B2 * | 10/2007 | Kaku et al. | 428/195.1 |
| 7,316,848 B2 | 1/2008 | Longmoore | |
| 7,320,773 B2 * | 1/2008 | Egawa | 264/331.11 |
| 7,351,772 B2 * | 4/2008 | Yano et al. | 525/412 |
| 7,351,785 B2 * | 4/2008 | Matsumoto et al. | 528/354 |
| 7,354,973 B2 * | 4/2008 | Flexman | 525/162 |
| 7,368,160 B2 * | 5/2008 | Inglis | 428/212 |
| 7,368,496 B2 | 5/2008 | Kim et al. | |
| 7,390,543 B2 | 6/2008 | Itoh et al. | |
| 7,390,558 B2 * | 6/2008 | Aritake et al. | 428/212 |
| 7,449,510 B2 * | 11/2008 | Ueda et al. | 524/442 |
| 7,452,927 B2 | 11/2008 | Hayes | |
| 7,491,359 B2 | 2/2009 | Bourgeois | |
| 7,501,176 B2 | 3/2009 | Yamasaki et al. | |
| 7,521,103 B2 | 4/2009 | Posey | |
| 7,566,753 B2 | 7/2009 | Randall et al. | |
| 7,589,151 B2 | 9/2009 | Aoki et al. | |
| 7,619,025 B2 * | 11/2009 | Mohanty et al. | 524/445 |
| 7,678,444 B2 | 3/2010 | Tedford, Jr. et al. | |
| 7,713,636 B2 | 5/2010 | Song et al. | |
| 7,714,048 B2 * | 5/2010 | Goino et al. | 524/157 |
| 7,786,210 B2 | 8/2010 | Uradnisheck et al. | |
| 7,799,399 B2 | 9/2010 | Sargeant et al. | |
| 7,820,276 B2 * | 10/2010 | Sukigara et al. | 428/212 |
| 7,834,092 B2 | 11/2010 | Uradnisheck et al. | |
| 7,847,184 B2 | 12/2010 | Hayes et al. | |
| 7,854,994 B2 | 12/2010 | Henderson-Rutgers et al. | |
| 7,943,218 B2 * | 5/2011 | Knoerzer et al. | 428/35.4 |
| 7,951,438 B2 * | 5/2011 | Lee et al. | 428/35.8 |
| 7,993,745 B2 * | 8/2011 | Narita et al. | 428/339 |
| 8,003,731 B2 * | 8/2011 | Seeliger et al. | 525/166 |
| 8,043,674 B2 | 10/2011 | Rehkugler et al. | |
| 8,053,219 B2 | 11/2011 | Kang et al. | |
| 8,062,721 B2 * | 11/2011 | Kawahara et al. | 428/34.1 |
| 8,080,297 B2 | 12/2011 | Kravitz et al. | |
| 8,252,421 B2 | 8/2012 | Arai et al. | |
| 8,450,420 B2 | 5/2013 | Sakurai | |
| 2001/0031348 A1 | 10/2001 | Jud et al. | |
| 2002/0006485 A1 | 1/2002 | Bening et al. | |
| 2002/0028857 A1 | 3/2002 | Holy | |
| 2002/0076554 A1 | 6/2002 | Stopper | |
| 2002/0086940 A1 | 7/2002 | Ota et al. | |
| 2002/0094444 A1 * | 7/2002 | Nakata et al. | 428/480 |
| 2002/0127358 A1 | 9/2002 | Berlin et al. | |
| 2003/0039775 A1 * | 2/2003 | Kong | 428/34.9 |
| 2003/0175545 A1 | 9/2003 | Kastner et al. | |
| 2003/0199218 A1 | 10/2003 | Mueller et al. | |
| 2004/0053064 A1 | 3/2004 | Masuda et al. | |
| 2004/0096677 A1 | 5/2004 | Imai et al. | |
| 2004/0185282 A1 | 9/2004 | Rosenbaum et al. | |
| 2004/0191541 A1 | 9/2004 | Squier et al. | |
| 2004/0258857 A1 | 12/2004 | Dagan et al. | |
| 2005/0098928 A1 | 5/2005 | Rosenbaum et al. | |
| 2005/0131120 A1 | 6/2005 | Flexman | |
| 2005/0186414 A1 | 8/2005 | Su et al. | |
| 2005/0250931 A1 | 11/2005 | Takagi | |
| 2005/0287358 A1 | 12/2005 | Inglis | |
| 2006/0009611 A1 | 1/2006 | Hayes | |
| 2006/0019111 A1 | 1/2006 | Sawai et al. | |
| 2006/0068200 A1 | 3/2006 | Cleckner et al. | |
| 2006/0116471 A1 | 6/2006 | Aoyama et al. | |
| 2006/0135668 A1 | 6/2006 | Hayes | |
| 2006/0257585 A1 | 11/2006 | Schiller et al. | |
| 2006/0257676 A1 | 11/2006 | Itada et al. | |
| 2006/0269755 A1 | 11/2006 | Song | |
| 2007/0020448 A1 | 1/2007 | Hubbard et al. | |
| 2007/0032577 A1 | 2/2007 | Kanzawa et al. | |
| 2007/0036923 A1 | 2/2007 | Ishizaki et al. | |
| 2007/0054070 A1 | 3/2007 | Laney et al. | |
| 2007/0087131 A1 | 4/2007 | Hutchinson et al. | |
| 2007/0098966 A1 | 5/2007 | Zhou | |
| 2007/0141372 A1 | 6/2007 | Su et al. | |
| 2007/0179218 A1 | 8/2007 | Brake et al. | |
| 2007/0182041 A1 | 8/2007 | Rizk et al. | |
| 2007/0254160 A1 | 11/2007 | Kravitz et al. | |
| 2007/0259139 A1 * | 11/2007 | Furneaux | 428/34.3 |
| 2008/0027178 A1 | 1/2008 | Uradnisheck | |
| 2008/0160327 A1 | 7/2008 | Knoerzer et al. | |
| 2008/0188154 A1 | 8/2008 | Leis et al. | |
| 2008/0311813 A1 | 12/2008 | Ting et al. | |
| 2009/0022919 A1 | 1/2009 | Chicarella et al. | |
| 2009/0053489 A1 | 2/2009 | Yamamura et al. | |
| 2009/0098375 A1 | 4/2009 | Voisin et al. | |
| 2009/0098395 A1 | 4/2009 | Lu | |
| 2009/0148713 A1 | 6/2009 | Lee et al. | |
| 2009/0148715 A1 | 6/2009 | Lee | |
| 2009/0169844 A1 | 7/2009 | Yamamura et al. | |
| 2009/0171065 A1 | 7/2009 | Nakamura et al. | |
| 2009/0263600 A1 | 10/2009 | Miyashita et al. | |
| 2009/0263654 A1 | 10/2009 | Arai et al. | |
| 2009/0286090 A1 | 11/2009 | Ting et al. | |
| 2009/0311544 A1 * | 12/2009 | Lee et al. | 428/458 |
| 2009/0312462 A1 | 12/2009 | Oakley et al. | |
| 2010/0009208 A1 | 1/2010 | Lee | |
| 2010/0040904 A1 | 2/2010 | Cloutier et al. | |
| 2010/0092791 A1 | 4/2010 | Busch et al. | |

(56) References Cited

U.S. PATENT DOCUMENTS

| | | | |
|---|---|---|---|
| 2010/0151167 A1 | 6/2010 | Gohil | |
| 2010/0247886 A1 | 9/2010 | Lee et al. | |
| 2010/0330382 A1* | 12/2010 | Dou et al. | 428/457 |
| 2011/0028622 A1 | 2/2011 | Uradnisheck | |
| 2011/0046254 A1 | 2/2011 | Shin et al. | |
| 2011/0052867 A1 | 3/2011 | Yamamura et al. | |
| 2011/0171489 A1 | 7/2011 | Dou et al. | |
| 2011/0244185 A1* | 10/2011 | Dou et al. | 428/156 |
| 2011/0244186 A1* | 10/2011 | Dou et al. | 428/156 |
| 2011/0244257 A1 | 10/2011 | Paulino et al. | |
| 2012/0088108 A1 | 4/2012 | Paolilli et al. | |
| 2012/0141766 A1 | 6/2012 | Paulino et al. | |
| 2013/0143057 A1 | 6/2013 | Paolilli et al. | |
| 2013/0143064 A1 | 6/2013 | Paolilli et al. | |

FOREIGN PATENT DOCUMENTS

| | | | |
|---|---|---|---|
| EP | 1 385 700 | | 7/2005 |
| EP | 1 619 021 | | 1/2006 |
| EP | 1 385 899 | | 2/2007 |
| EP | 1 839 849 | | 10/2007 |
| EP | 1 942 001 | | 7/2008 |
| EP | 1 955 845 | | 8/2008 |
| EP | 2065178 | | 6/2009 |
| EP | 2 133 382 | | 12/2009 |
| JP | 8-176329 | | 7/1996 |
| JP | 2002-155207 | | 5/2002 |
| JP | 2003-145677 | | 5/2003 |
| JP | 2003-170560 | * | 6/2003 |
| JP | 2003-170560 | * | 7/2003 |
| JP | 2003-276144 | | 9/2003 |
| JP | 2004-82512 | | 3/2004 |
| JP | 2004-315586 | | 11/2004 |
| JP | 2004-323592 | | 11/2004 |
| JP | 2004-358721 | | 12/2004 |
| JP | 2006-176758 | | 7/2006 |
| JP | 2006-263892 | | 10/2006 |
| JP | 2007-076192 | | 3/2007 |
| JP | 2007-99952 | | 4/2007 |
| JP | 2007-269995 | | 10/2007 |
| JP | 2008-062591 | * | 3/2008 |
| JP | 2008-062984 | * | 3/2008 |
| KR | 10-2006-0099887 | | 9/2006 |
| KR | 10-2007-0102005 | | 10/2007 |
| WO | WO-94/17220 | | 8/1994 |
| WO | WO-02/087877 | | 11/2002 |
| WO | WO-02/088230 | | 11/2002 |
| WO | WO-2004/016417 | | 2/2004 |
| WO | WO-2004/060648 | | 7/2004 |
| WO | WO-2004/087812 | | 10/2004 |
| WO | WO-2004/094143 | | 11/2004 |
| WO | WO-2004/101642 | | 11/2004 |
| WO | WO-2005/053964 | | 6/2005 |
| WO | WO-2005/059031 | | 6/2005 |
| WO | WO-2007/046174 | | 4/2007 |
| WO | WO-2007/118280 | | 10/2007 |
| WO | WO-2008/020726 | | 2/2008 |
| WO | WO-2008/035557 | | 3/2008 |
| WO | WO-2009/076458 | | 6/2009 |
| WO | WO 2009/076541 | * | 6/2009 |
| WO | WO-2009/076541 | | 6/2009 |
| WO | WO-2009/084518 | | 7/2009 |
| WO | WO-2009/142825 | | 11/2009 |
| WO | WO-2009/152427 | | 12/2009 |
| WO | WO-2010/019944 | | 2/2010 |

OTHER PUBLICATIONS

Priddy D. (2010). "Improving PLA mechanical properties by the addition of oil," Polymer Engineering and Science 50(3): 513-519.

Shichen Dou et al., U.S. Appl. No. 12/977,647, filed Dec. 23, 2010; 59 pages.

Defosse, Matt. "Film extrusion: Bioplastic barrier film matches EVOH, PA," located at <http://www.plasticstoday.com/print/31263> visited on Nov. 20, 2009. (1 page).

"Coextruded Film Structures of PLA and EVOH," presented at Tappi Place Conference, Albuquerque, New Mexico, Apr. 18-21, 2010; 31 pages.

Shichen Dou et al., U.S. Appl. No. 13/030,392, filed Feb. 18, 2011; 63 pages.

International Search Report and Written Opinion mailed Feb. 11, 2011, directed to International Patent Application No. PCT/US10/50227; 10 pages.

International Search Report and Written Opinion mailed Mar. 14, 2011, directed to International Patent Application No. PCT/US10/62062; 10 pages.

Dou, S. et al., U.S. Appl. No. 13/077,302, filed Mar. 31, 2011; 65 pages.

International Search Report and Written Opinion mailed Jun. 3, 2011, directed to International Patent Application No. PCT/US11/25466; 9 pages.

International Search Report and Written Opinion mailed May 26, 2011, directed to International Patent Application No. PCT/US11/30784; 9 pages.

TAPPI Conference Presentation, May 2003, "Adhesive Properties of Ethylene-Acrylic Ester-Maleic Anhydride Terpolymers in Extrusion Coating/Lamination"; (27 pages).

Product Literature Presentation, May 2005, "Lotader: Ultra Versatile Adhesives for Extrusion Coating and Extrusion Lamination Technologies"; (18 pages).

Jiang, et al., (Nov. 23, 2005). "Study of Biodegradable Polylactide/Poly(butylene adipate-co-terephthalate) Blends," Biomacromolecules. 7(1):199-207.

International Search Report and Written Opinion mailed on Feb. 6, 2009, directed to counterpart international Application No. PCT/US2008/86261; 8 pages.

International Search Report and Written Opinion mailed on Feb. 6, 2009, directed to counterpart International Patent Application No. PCT/US2008/86450; 5 pages.

International Search Report mailed on Oct. 1, 2009 directed at international application No. PCT/US2009/054022; 12 pages.

International Search Report and Written Opinion mailed on Aug. 17, 2010, directed to counterpart International Patent Application No. PCT/US10/38848; 11 pages.

International Search Report and Written Opinion mailed on Sep. 1, 2010, directed to counterpart International Patent Application No. PCT/US2010/040185; 10 pages.

Lee et al., U.S. Office Action mailed Jun. 25, 2009, directed to U.S. Appl. No. 12/332,153; 9 pages.

Lee et al., U.S. Office Action mailed on Dec. 23, 2009, directed at U.S. Appl. No. 12/332,153; 10 pages.

Lee et al., U.S. Office Action mailed on Apr. 12, 2010, directed at U.S. Appl. No. 12/332,153; 11 pages.

Lee et al., U.S. Office Action mailed on Sep. 28, 2010, directed at U.S. Appl. No. 12/332,153; 9 pages.

Shichen Dou et al., U.S. Appl. No. 12/824,759, filed Jun. 28, 2010; 30 pages.

Tracy A. Paolilli et al., U.S. Appl. No. 12/890,349, filed Sep. 24, 2010; 50 pages.

Shichin Dou et al., U.S. Appl. No. 61/218,846, filed Jun. 19, 2009; 13 pages.

Lee, U.S. Office Action mailed Sep. 27, 2011, directed to U.S. Appl. No. 12/333,047; 7 pages.

Biofilm S.A. "Prospect on PLA applications: Clear Barrier Technology" promotional literature presented at "Innovation Takes Root" by Nature Works, Las Vegas NV. Sep. 16-18, 2008; 16 pages.

Cloutier et al., U.S. Office Action mailed Oct. 27, 2011 directed to U.S. Appl. No. 12/542,428; 13 pages.

Dou et al., U.S. Office Action mailed Aug. 20, 2012, directed to U.S. Appl. No. 12/824,759; 12 pages.

Dou et al., U.S. Office Action mailed Sep. 7, 2012, directed to U.S. Appl. No. 13/077,302; 12 pages.

Lee, U.S. Office Action mailed May 25, 2012, directed to U.S. Appl. No. 12/333,047; 9 pages.

Cloutier et al., U.S. Office Action mailed Jul. 6, 2012, directed to U.S. Appl. No. 12/542,428; 10 pages.

Dou, et al., U.S. Office Action mailed Jun. 29, 2012, directed to U.S. Appl. No. 12/977,647; 21 pages.

(56) References Cited

OTHER PUBLICATIONS

Extended Search Report dated Nov. 6, 2012, directed to EP Application No. 08859113.6; 6 pages.
Dou et al., U.S. Office Action mailed Apr. 24, 2013, directed to U.S. Appl. No. 13/030,392; 12 pages.
Dou et al., U.S. Office Action mailed Dec. 12, 2012, directed to U.S. Appl. No. 12/977,647; 12 pages.
Paulino et al., U.S. Office Action mailed Dec. 26, 2012, directed to U.S. Appl. No. 13/107,149; 15 pages.
Paolilli et al., U.S. Office Action mailed Jan. 16, 2013, directed to U.S. Appl. No. 12/890,349; 11 pages.
Dou et al., U.S. Office Action mailed Jan. 22, 2013, directed to U.S. Appl. No. 12/824,759; 9 pages.
Dou et al., U.S. Office Action mailed Feb. 14, 2013, directed to U.S. Appl. No. 13/077,302; 13 pages.
Cloutier et al., Office Action mailed Jun. 19, 2013, directed to U.S. Appl. No. 12/542,428; 10 pages.
Lee et al., Office Action mailed Sep. 20, 2012, directed to U.S. Appl. No. 12/731,925; 18 pages.
Lee et al., Office Action mailed Jun. 4, 2013, directed to U.S. Appl. No. 12/731,925; 18 pages.
Extended Search Report dated Nov. 14, 2012, directed to EP Application No. 08860690.0; 6 pages.
Cloutier et al., U.S. Office Action mailed Nov. 22, 2013, directed to U.S. Appl. No. 12/542,428; 10 pages.
Extended Search Report dated Nov. 21, 2012, directed to EP Application No. 09807412.3; 6 pages.
International Search Report and Written Opinion mailed May 7, 2010, directed to International Application No. PCT/US10/028685; 8 pages.
Extended Search Report dated May 3, 2013, directed to EP Application No. 10756851.1; 5 pages.
Canadian Office Action mailed Apr. 16, 2013, directed to CA Application 2,766,816; 2 pages.
Paolilli et al., U.S. Office Action mailed Oct. 10, 2013, directed to U.S. Appl. No. 13/754,215; 10 pages.
Markarian, Jennifer. (May/Jun. 2008). "Biopolymers present new market opportunities for additives in packaging," *Plastics, Additives, and Compounding* 10(3): 22-25.
Paulino et al., U.S. Office Action mailed Aug. 5, 2013, directed to U.S. Appl. No. 13/107,149; 20 pages.
Paolilli et al., U.S. Office Action mailed Jul. 17, 2013, directed to U.S. Appl. No. 12/890,349; 12 pages.
Paolilli et al., U.S. Office Action mailed Sep. 3, 2013, directed to U.S. Appl. No. 13/754,476; 8 pages.
Dou et al., U.S. Office Action mailed Sep. 24, 2013, directed to U.S. Appl. No. 13/030,392; 9 pages.
Paulino et al., U.S. Office Action mailed May 22, 2013, directed to U.S. Appl. No. 13/313,567; 9 pages.
Paulino et al., U.S. Office Action mailed Oct. 16, 2013, directed to U.S. Appl. No. 13/313,567; 8 pages.
Paulino et al., U.S. Office Action mailed Feb. 26, 2014, directed to U.S. Appl. No. 13/313,567; 15 pages.
Lee, U.S. Office Action mailed Mar. 27, 2014, directed to U.S. Appl. No. 12/333,047; 14 pages.
Paolilli et al., U.S. Office Action mailed Apr. 9, 2014, directed to U.S. Appl. No. 12/890,349; 12 pages.
Dou et al., U.S. Office Action mailed Jun. 17, 2014, directed to U.S. Appl. No. 13/077,302; 12 pages.
Cloutier et al., U.S. Office Action mailed Jul. 24, 2014, directed to U.S. Appl. No. 12/542,428; 10 pages.
Office Action dated Jul. 7, 2014, directed to MX Application No. MX/a/2011/001623; 7 pages.
Dou et al., U.S. Office Action mailed Aug. 13, 2014, directed to U.S. Appl. No. 13/030,392; 12 pages.
Paolilli et al. U.S. Office Action mailed Oct. 8, 2014, directed to U.S. Appl. No. 12/890,349; 16 pages.
Paulino et al., U.S. Office Action mailed Jan. 23, 2015, directed to U.S. Appl. No. 13/107,149; 26 pages.
Cloutier et al., U.S. Office Action mailed Feb. 5, 2015, directed to U.S. Appl. No. 12/542,428; 11 pages.
Dou et al., U.S. Office Action mailed Mar. 12, 2015, directed to U.S. Appl. No. 13/030,392; 8 pages.
International Search Report and Written Opinion, mailed Aug. 17, 2011, directed to International Patent Application No. PCT/US11/36453; 11 pages.
Wallach, J. et al., "Methacrylic Group Functionalized Poly(lactic acid) Macromonomers from Chemical Recycling of Poly(lactic acid)." *Polymers from Renewable Resources*, ACS Symposium Series [online]. Jan. 15, 2001. Chapter 18, pp. 281-292: Retrieved from the Internet: URL:http://pubs.acs.org/doi/abs/10.1021/bk-2000-0764.ch018, Abstract only.
Paulino et al., U.S. Office Action mailed Oct. 23, 2014, directed to U.S. Appl. No. 13/313,567; 12 pages.
Dou et al., U.S. Office Action mailed Nov. 5, 2014, directed to U.S. Appl. No. 12/977,647; 12 pages.
Dou et al., U.S. Office Action mailed Nov. 6, 2014, directed to U.S. Appl. No. 13/077,302; 11 pages.
Dou et al., U.S. Office Action mailed May 20, 2015, directed to U.S. Appl. No. 12/977,647; 12 pages.
Paulino et al., U.S. Office Action mailed May 21, 2015, directed to U.S. Appl. No. 13/313,567; 15 pages.
Dou et al., U.S. Office Action mailed May 22, 2015, directed to U.S. Appl. No. 13/077,302; 12 pages.
Cloutier et al., U.S. Office Action mailed Jul. 30, 2015, directed to U.S. Appl. No. 12/542,428; 5 pages.
Supplementary European Search Report mailed Jul. 24, 2015, directed to EP Application No. 10819546.2; 7 pages.

\* cited by examiner

BIAXIALLY ORIENTED POLYLACTIC ACID FILM WITH IMPROVED HEAT SEAL PROPERTIES

CROSS-REFERENCE TO RELATED APPLICATIONS

This Application claims the benefit of U.S. Provisional Application Ser. No. 61/218,846, filed on Jun. 19, 2009.

FIELD OF THE INVENTION

This invention relates to a multi-layer biaxially oriented polylactic acid (BOPLA) film with a novel formulation to improve the heat seal initiation and heat seal performance while maintaining good optical clarity of the film's appearance.

BACKGROUND OF THE INVENTION

Biaxially oriented polypropylene films are typically used for packaging, decorative, and label applications and often performs multiple functions. In a lamination, they provide printability, transparent or matte appearance, or slip properties. The films sometimes provide a surface suitable for receiving organic or inorganic coatings for gas and moisture barrier properties. The films sometimes provide a heat sealable layer for bag forming and sealing, or a layer that is suitable for receiving an adhesive either by coating or by laminating.

However, in recent years, interest in "greener" packaging has been strongly developing. Packaging materials based on biologically derived polymers are increasing due to concerns with renewable resources, raw materials, and greenhouse gas generation. Bio-based polymers are believed—once fully scaled-up—to help reduce reliance on petroleum, reduce production of greenhouse gases, and can be biodegradable or compostable as well. Bio-based polymers such as polylactic acid (PLA)—which is currently derived from corn starch (but can be derived from other plant sugars) and thus, can be considered to be derived from a renewable resource—is one of the more popular and commercially available materials available for packaging film applications. Other bio-based polymers such as polyhydroxyalkanoates (PHA) and particularly polyhydroxybutyrate (PHB), are also of high interest, and are starting to become commercially available at the time of this writing.

Typically, biaxially oriented polylactic acid (BOPLA) films are transparent with a high clarity and high gloss. In some packaging applications, this is very desirable for printing graphics with high visual appeal—or "pop"—and to provide high resolution of the desired images. Polylactic acid (PLA), being a polar polymer, naturally has a high surface energy that helps enable good wettability of the types of printing inks and colors used in packaging. In addition, multi-layer BOPLA films can be formed via coextrusion of several melt streams of PLA-based resins. One example could be a two-layer coextruded film structure in which a base or core layer including a crystalline PLA and a thinner "skin" layer including amorphous PLA is coextruded upon one side of the core layer and then biaxially oriented into a film. The amorphous PLA layer is often used to provide heat sealability to the film as it is less crystalline and generally has a lower melting point than the higher crystallinity core layer.

For such a bio-based polymer to be fit-for-use for many snack food-packaging applications, it is desirable that the bio-based polymer film match as many of the attributes possible that BOPP is well known for, such as heat sealability, printability, controlled COF, metallizability, gas barrier, etc. Since BOPLA film tends to have poorer thermal dimensional shrinkage properties in the machine and transverse direction orientations than BOPP film does, a BOPLA lamination may not perform as well on a packaging machine optimized for BOPP laminations. It has been noted that bag-making on a packaging machine designed for BOPP laminations has certain expectations for heat seal setpoints and bag-making speeds. It has also been found that replacing an all-BOPP lamination with an all-BOPLA lamination can—in some cases—result in distortion of the bag around the heat-sealed areas, namely the end seals of the bag and the back seal of the bag. Although the typical amorphous PLA used as a heat seal layer in BOPLA films generally has a lower melting point and lower seal initiation temperature than conventional propylene-based heat seal resins (e.g. copolymers of propylene, ethylene, and/or butylene), in a typical packaging machine designed for BOPP laminations, the heated sealing bars are generally too hot for BOPLA laminations causing distortion in the sealed areas.

This is aesthetically unacceptable to many food packaging companies. Solutions to circumvent the distortion issue with BOPLA laminations involve reducing the heat sealing bar temperature setpoint or lowering the bag-making speed of the packaging machine. However, it has been found that temperature control and consistency of the heat sealing bars are highly variable and insufficient to reliably control the distortion problems, especially across a large fleet of packaging machines that may include different models and designs; and lowering the bag-making speed is generally unacceptable due to unit cost issues of the bagged product. One solution could be to improve the thermal stability of BOPLA films; another solution could be to improve the seal range of BOPLA films by lowering the seal initiation temperature of the amorphous PLA sealant layer such that high bag-making speeds can be maintained with lower setpoint temperatures on the sealing bars.

Thus, it is often desirable to have heat sealable films and laminations with a low sealing initiation temperature. Lower sealing temperatures can improve productivity of packaging machines and help lower overall product costs. By being able to seal packages at lower temperatures, the packager can reduce energy usage and costs. Further, by having packages made with low seal initiating materials, productivity can be improved by the ability to run packaging machines at a higher speed or higher number of packages per minute. This is due to a reduced dwell time required for sufficient thermal transfer of heat energy from the packaging machine's sealing bars to the sealant resin.

U.S. Pat. No. 7,128,969 describes a film composed of a base layer of PLA with a minority component of a thermoplastic or polyolefin such as polypropylene or polyethylene, typically less than 1% by weight of the base layer. Such a formulation is particularly suitable for thermoforming or biaxial stretching by means of pneumatic drawing or other mechanical forming. However, the invention is not suitable for high transverse orientation rates in excess of 6 TDX; the highest TDX cited in the examples is 5.5. Such polyolefins typically have a higher melting point that amorphous PLA and in addition, are petroleum-based and are non-compostable or degradable.

U.S. Pat. No. 7,368,160 describes a multi-layer coextruded biaxially oriented PLA film which uses an amorphous PLA resin that is heat sealable. However, there is no teaching for further improving the heat sealing properties or characteristics of such a film.

U.S. Pat. No. 6,649,732 describes a single layer extruded cast or oriented PLA film coated with a gas barrier material such as silicon oxide. The patent discloses that the film may be coextruded with a second resin but is silent on the nature of the second resin and does not indicate its improvement of heat-sealing properties.

U.S. Pat. No. 6,713,175 describes a single-layer biaxially oriented PLA film that is heat sealable using a PLA resin of a certain storage elastic modulus at 120° C. of 100-230 MPa. However, the patent is silent on improving further the heat seal properties of such a film. Moreover, the use of a single-layer heat sealable film can give rise to other issues in terms of film handling, processing, and sticking to equipment parts.

U.S. Pat. No. 6,153,276 describes a heat sealable PLA-based polymer laminate having an amorphous PLA layer and a crystalline PLA base layer. However, the patent is silent on methods to improve further the heat sealable properties of amorphous PLA.

U.S. Pat. No. 7,390,558 describes multi-layer biaxially oriented PLA film composed of two layers of varying blends of crystalline and amorphous PLA wherein one layer has the amorphous PLA as a majority component and the second layer has the amorphous PLA as a minority component. The heat sealable layer would presumably be the layer containing a majority of amorphous PLA. It would be expected that the heat seal initiation temperature of a blended layer of amorphous PLA and crystalline PLA would be worse than that of a wholly amorphous PLA layer.

U.S. patent application Ser. No. 12/333,047 describes a method to produce biaxially oriented PLA films at high transverse orientation rates using a specific processing aid such as an ethylene-acrylate copolymer. This reference is incorporated in its entirety in this application.

The inventors seek to address the above issues of making improved heat sealable biaxially oriented PLA films.

SUMMARY OF THE INVENTION

The inventors have found a solution that lowers the heat seal initiation temperature and broadens the heat seal range of typical amorphous PLA heat seal resins. Formulations that accomplish this goal as well as being miscible with PLA resin, resulting in acceptably clear, transparent film, as well as maintaining the biodegradability of the BOPLA film are provided. It is also contemplated to use this formulation as part of a metallized BOPLA film or opaque BOPLA films, or combinations thereof. The films include a formulation for BOPLA films that includes a minority amount of a modifier that is added to amorphous PLA resins.

One embodiment is a multi-layer biaxially oriented laminate film including a first layer (C) of a heat sealable resin including a substantially amorphous PLA resin and a modifying resin to improve heat seal initiation; and a second layer (B) including a substantially crystalline PLA resin-containing blend on one side of the sealable amorphous PLA layer. This second crystalline PLA resin-containing blend layer (B) could be considered a core or base layer to provide the bulk strength of the laminate film.

The second PLA core layer (B) may include a crystalline PLA homopolymer, which may be combined with an optional amount of ethylene-acrylate copolymer that acts as a processing aid to enable high transverse orientation rates of 8-11×. The second PLA core layer (B) may also include an optional amount of amorphous PLA blended with the crystalline PLA. The second PLA core layer (B) can also include inorganic antiblock particles of suitable size, selected from amorphous silicas, aluminosilicates, sodium calcium aluminum silicates, crosslinked silicone polymers, and/or polymethylmethacrylates to act as antiblocks for film handling or machinability. Suitable amounts range from 0.03-0.5% by weight of the core layer and typical particle sizes of 2.0-6.0 μm in diameter. If so desired, cavitating agents may be added to the core layer (B) such that upon biaxial orientation, voids are formed within this layer, thus rendering the film a matte or opaque and often, pearlescent white appearance. Such cavitating agents may in inorganic particles such as calcium carbonate, talc, or other minerals; or polymeric cavitating agents such as polystyrene, cyclic olefin copolymer, or other polymers. Titanium oxides may also be incorporated with the cavitating agent to provide a brighter white appearance.

To improve the heat seal initiation properties of the heat sealable amorphous PLA layer (C), a minority amount of a modifying resin including poly(butylene adipate-co-butylene terephthalate) (PBAT) or polycaprolactone (PCL) or blends thereof, may be dry-blended or melt-blended with the amorphous PLA resin. Amounts of this modifying resin or blend of resins to be used is on the order of 1 wt % to 50 wt % of the heat sealable layer (C). Preferably, the amount should be 5-30 wt % of the layer (C), and even more preferably, 10-20 wt %. Quantity of the modifying resin in this latter range have been found to sufficiently lower the seal initiation of the heat seal property, yet maintain processability during film-making as well as to help keep cost of the film economical. These modifiers of PBAT or PCL also have the advantage of being fully biodegradable and compostable materials; this is important in that the overall degradability and/or compostability of the whole multi-layer film is maintained. Preferably, the amount of modifying resin added to the heat seal layer improves seal initiation temperature by at least 5° F. (2.8° F.) and maintains compostability per ASTM D6400-99 in less than 180 days. Preferably, the PLA layer (C), comprises at least 50 wt % amorphous PLA, more preferably at least 70 wt %, even more preferably at least 80 wt %.

Other biodegradable/compostable materials can be used as a modifier, especially if their melting points are lower than that of the amorphous PLA. For example, it can be contemplated that using amorphous PLA blends with PHAs and PHBs of relatively lower melting point and/or amorphous composition can also be used to improve the seal initiation properties over using amorphous PLA alone. In fact, it can be contemplated to use other types of aliphatic copolyesters or aromatic copolyesters such as poly(butylene succinate adipate) (PBSA), polybutylene succinate (PBS), or others that have demonstrated compostability/degradability properties and which demonstrate amorphous behavior and relatively lower crystallinity.

The first heat sealable layer (C) includes an amorphous PLA resin and a modifying resin which provides heat sealable properties to the laminate and also may include various additives such as antiblock particles to allow for easier film handling. Furthermore, the laminate could further include a third PLA resin-containing layer (A) on the second PLA resin-containing core layer (B) opposite the side with the amorphous PLA sealable layer (C) for use as a printing layer (i.e. printing ink receiving layer) or metal receiving layer or coating receiving layer. This third layer (A) of this laminate can include either an amorphous PLA or a crystalline PLA, or blends thereof. This third layer could also incorporate various additives such as antiblock particles for film-handling purposes. If desired, this third layer (A) could also include the same or similar composition as the inventive sealable layer (C), thus rendering the overall multi-layer film a two-side sealable film.

Preferably, the second PLA resin-containing core layer (B) includes a crystalline polylactic acid homopolymer of about 90-100 wt % L-lactic acid units (or 0-10 wt % D-lactic acid units). An optional amount of amorphous PLA may also be blended in with the crystalline PLA from 0-48 wt % of the core layer. The amorphous PLA is also based on L-lactic acid units but has greater than 10 wt % D-lactic acid units and/or meso-lactide units (which includes one each of L and D lactic acid residuals). An optional amount of ethylene-acrylate copolymer can also be added to the core layer at about 2-10 wt % of the core layer as a process aid for orientation, particularly transverse orientation. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer. If the multi-layer film embodiment is a 2-layer film design of core layer (B) and heat seal layer (C), it may be useful to also add antiblock particles to the core layer (B) of appropriate size and quantity such that the surface of core layer (B) that is opposite the side of heat seal layer (C) contains exposed antiblock particles to aid in film handling, film rewinding, and machinability. Suitable antiblock components can be selected from the group consisting of amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03-0.5% by weight of the core layer and typical particle sizes of 2.0-6.0 µm in diameter, depending on the final thickness of this layer.

Preferably, the first PLA heat sealable resin-containing layer (C) includes an amorphous PLA of greater than 10 wt % D-lactic acid units and an amount of PCL, PBAT, or blends thereof. It is not necessary to use any of the impact modifier/process aid ethylene-acrylate copolymer in this case, as the amorphous PLA resin blend can be oriented relatively easily. This first heat sealable amorphous PLA resin-containing layer (C) can also include an antiblock component selected from the group consisting of amorphous silicas, aluminosilicates, sodium calcium aluminum silicates, crosslinked silicone polymers, and polymethylmethacrylates to aid in machinability and winding and to lower coefficient of friction (COF) properties. Suitable amounts range from 0.03-0.5% by weight of the heat sealable layer and typical particle sizes of 2.0-6.0 µm in diameter, depending on the final thickness of this layer. Migratory slip additives may also be contemplated to control COF properties such as fatty amides (e.g. erucamide, stearamide, oleamide, etc.) or silicone oils ranging from low molecular weight oils to ultra high molecular weight gels. Suitable amounts of slip additives to use can range from 300 ppm to 10,000 ppm of the layer.

In the embodiment of a three-layer coextruded film structure, the third PLA-based layer (A) can include similar amounts of antiblock and slip additives as the respective core and heat sealable layers, although the amounts are likely to be optimized for performance. In this embodiment, it is not necessary for the core layer (B) to include antiblock particles (although migratory additives may still be included in the core layer as a reservoir from which such additives may migrate to the outer surface layers as desired).

In the case where the above embodiments are to be used as a substrate for vacuum deposition metallizing, it is recommended that migratory slip additives not be used as these types of materials may adversely affect the metal adhesion or metallized gas barrier properties of the metallized BOPLA film. It is thought that as the hot metal vapor condenses on the film substrate, such fatty amides or silicone oils on the surface of the film could vaporize and cause pin-holing of the metal-deposited layer, thus compromising gas barrier properties. Thus, only non-migratory antiblock materials should be used to control COF and web-handling.

In the case where the above embodiments are to be used as a printing film, it may be advisable to avoid the use of silicone oils, in particular low molecular weight oils, as these may interfere with the print quality of certain ink systems used in process printing applications. However, this depends greatly upon the ink system and printing process used.

For these multi-layer film structures described above, it is preferable to discharge-treat the side of this multi-layer film structure opposite the heat sealable first layer (C) for lamination, metallizing, printing, or coating. A particularly preferred use is for printing. In the case of a 2-layer laminate structure wherein the amorphous PLA sealable layer (C) is contiguous with a crystalline PLA core layer (B), it is preferable to discharge-treat the side of the core layer opposite the sealable layer for purposes of laminating, printing, metallizing, coating, etc. In the case of a S-layer laminate structure, it is preferable to discharge-treat the side of the third layer (A) which is contiguous to the side of the core layer (B) opposite the heat sealable first layer (C). This third layer, as mentioned previously, is often formulated with materials that are conducive to receiving printing inks, metallizing, adhesives, or coatings.

Discharge-treatment in the above embodiments can be accomplished by several means, including but not limited to corona, flame, plasma, or corona in a controlled atmosphere of selected gases. Preferably, in one variation, the discharge-treated surface has a corona discharge-treated surface formed in an atmosphere of $CO_2$ and $N_2$ to the exclusion of $O_2$. The laminate film embodiments could further include a vacuum-deposited metal layer on the discharge-treated layer's surface. Preferably, the metal layer has a thickness of about 5 to 100 nm, has an optical density of about 1.5 to 5.0, and includes aluminum, although other metals can be contemplated such as titanium, vanadium, chromium, manganese, iron, cobalt, nickel, copper, zinc, gold, or palladium, or alloys or blends thereof.

Preferably, the laminate film is produced via coextrusion of the heat sealable layer and the blended core layer and other layers if desired, through a compositing die whereupon the molten multilayer film structure is quenched upon a chilled casting roll system or casting roll and water bath system and subsequently oriented in the machine and/or transverse direction into an oriented multi-layer film. Machine direction orientation rate is typically 2.0-3.0× and transverse direction orientation—with the use of the ethylene-acrylate impact modifier process aid—is typically 8.0-11.0×. Otherwise, without the ethylene-acrylate impact modifer process aid, transverse direction orientation may be limited to a lower rate, typically 3.0-6.0×. Heat setting conditions in the TDO oven is also critical to minimize thermal shrinkage effects.

Multi-layer BOPLA film was made using a 1.5-meter wide sequential orientation line process via coextrusion through a die, cast on a chill drum using an electrostatic pinner, oriented in the machine direction through a series of heated and differentially sped rolls, followed by transverse direction stretching in a tenter oven. The multilayer coextruded laminate sheet is coextruded at processing temperatures of ca. 190° C. to 230° C. through a die and cast onto a cooling drum whose surface temperature is controlled between 15° C. and 26° C. to solidify the non-oriented laminate sheet at a casting speed of about 6 mpm. The non-oriented laminate sheet is stretched in the longitudinal direction at about 55° C. to 65° C.

at a stretching ratio of about 3 to about 4 times the original length and the resulting stretched sheet is annealed at about 40° C. to 45° C. to obtain a uniaxially oriented laminate sheet. The uniaxially oriented laminate sheet is introduced into a tenter at a linespeed of ca. 18 to 50 mpm and preliminarily heated between about 65° C. and 75° C., and stretched in the transverse direction at about 75° C. to 90° C. at a stretching ratio of about 3-10 times the original width and then heat-set or annealed at about 90° C. to 135° C. to reduce internal stresses due to the orientation and minimize shrinkage and give a relatively thermally stable biaxially oriented sheet. It is also beneficial to "toe-in" the tenter rails about 5-10% of the maximum width of the tenter orientation stretching section so as also help reduce internal stresses and minimize thermal shrinkage.

A preferred embodiment is to use the multi-layer heat sealable film as a metallizing film via vapor-deposition, preferably a vapor-deposited aluminum layer, with an optical density of at least about 1.5, preferably with an optical density of about 2.0 to 4.0, and even more preferably between 2.3 and 3.2. Optionally, an additional third layer (A) specifically formulated for metallizing to provide adequate metal adhesion, metal gloss, and gas barrier properties can be disposed on the second PLA resin-containing core layer (B), opposite the side with the heat sealable layer (C). Additionally, this additional layer's surface may also be modified with a discharge treatment to make it suitable for metallizing, laminating, printing, or converter applied adhesives or other coatings.

This invention provides a method to allow the production of improved heat sealable BOPLA films using degradable and compostable modifiers. Such a film method and composition can result in faster packaging speeds with less distortion issues while maintaining attractive appearance, compostability, and cost.

Additional advantages of this invention will become readily apparent to those skilled in the art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

This invention relates to a multi-layer biaxially oriented polylactic acid (BOPLA) film with a novel formulation to improve the heat seal initiation and heat seal performance while maintaining good optical clarity of the film's appearance. The invention involves the use of polymer additives as a minority component in the film formulation, which enables the BOPLA film to become heat sealable at lower sealing temperatures for packaging applications, provides low haze and good optical clarity, and maintains compostability and degradability properties.

In one embodiment of the invention, the laminate film includes a two-layer biaxially oriented coextruded film of a PLA resin core layer (B) including a crystalline polylactic acid polymer, optionally blended with an amount of an amorphous PLA polymer and/or an amount of ethylene-acrylate copolymer; and a heat sealable layer (C) including an amorphous polylactic acid polymer with an amount of poly(butylene adipate-co-butylene terephthalate) copolymer, polycaproplactone, or blends thereof. The side of the crystalline PLA core layer (B) opposite the heat sealable layer (C) can be discharge-treated.

In another embodiment of the inventive multi-layer film, the film includes a similar 2-layer construction as above, except that a third PLA skin layer (A) may be disposed on the side of the crystalline PLA core layer blend (B) opposite the heat sealable amorphous PLA layer (C). This third PLA layer can include either crystalline PLA resin or amorphous PLA resin or blends thereof. In the case where crystalline PLA resin is part of this layer's formulation, an amount of ethylene-acrylate copolymer can be optionally incorporated as in the core layer formulation. Generally, it is desirable to discharge-treat the exposed surface of this third layer in order to provide further functionality as a surface to receive metallization, printing, coating, or laminating adhesives.

The polylactic acid resin core layer (B) is a crystalline polylactic acid of a specific optical isomer content and can be biaxially oriented. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals. The degree of crystallinity is determined by relatively long sequences of a particular residual, long sequences either of L or of D-lactic acid. The length of interrupting sequences is important for establishing the degree of crystallinity (or amorphous) and other polymer features such as crystallization rate, melting point, or melt processability. The crystalline polylactic acid resin is preferably one including primarily the L-lactide isomer with minority amounts of either D-lactide or meso-lactide or combinations of D-lactide and meso-lactide. Preferably, the minority amount is D-lactide and the amount of D-lactide is 10 wt % or less of the crystalline PLA polymer. More preferably, the amount of D-lactide is less than about 5 wt %, and even more preferably, less than about 2 wt %. Suitable examples of crystalline PLA for this invention are Natureworks® Ingeo™ 4042D and 4032D. These resins have relative viscosity of about 3.9-4.1, a melting point of about 165-173° C., a crystallization temperature of about 100-120° C., a glass transition temperature of about 55-62° C., a D-lactide content of about 4.25 wt % and 1.40 wt % respectively, density of about 1.25 g/cm$^3$, and a maximum residual lactide in the polylactide polymer of about 0.30% as determined by gas chromotography. Molecular weight $M_w$ is typically about 200,000; $M_n$ typically about 100,000; polydispersity about 2.0. Natureworks® 4032D is the more preferred crystalline PLA resin, being more crystalline than 4042D and more suitable for high heat biaxial orientation conditions. In addition, the 4042D PLA grade contains about 1000 ppm of erucamide and for some applications, particularly for gas barrier metallizing, may not be suitable.

The core resin layer (B) is typically 8 μm to 100 μm in thickness after biaxial orientation, preferably between 10 μm and 50 μm, and more preferably between about 15 μm and 25 μm in thickness. A preferred embodiment is to use the higher crystalline, higher L-lactide content PLA (lower wt % D-lactide of about 1.40) such as Natureworks® 4032D.

The core layer can also optionally include an amount of amorphous PLA resin to improve further extrusion processing and oriented film processing. The addition of amorphous PLA in the core layer helps to lower extrusion polymer pressure and in terms of film manufacturing, helps to reduce or slow crystallization rate of the newly oriented film. This aids in the orientation of the PLA film in both machine and transverse directions and helps reduce defects such as uneven stretch marks. It also helps with the slitting of the biaxially oriented film at the edge-trimming section of the line by reducing the brittleness of the edge trim and reducing the instances of edge trim breaks which can be an obstacle to good productivity. The amorphous PLA is preferably based on a L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., melting point approximately 148° C., heat seal initiation temperature of about 93° C., density of about 1.24 g/cm$^3$, a D-lactide content of about 12 wt %, and a maximum residual lactide in the polylactide polymer of about 0.30% as determined by gas chromatography. Molecular weight $M_w$ is about 180,000. Suitable amounts of amorphous PLA to use in the core are concentrations of up to about 48 wt % of the core layer, preferably up to about 30 wt % of the core layer, and even more preferably about 15-20 wt % of the core layer. It should be noted, however, that too much amorphous PLA in the core layer (e.g. 50% or greater) can cause high thermal shrinkage rates after biaxial orientation and in spite of heat-setting conditions in the transverse orientation oven to make a thermally stable film. A thermally, dimensionally stable film is important if the substrate is to be used as a metallizing, printing, coating, or laminating substrate. (However, if the BOPLA is desired as a shrinkable film, this composition and appropriate processing conditions might be suitable.)

An optional component of the core layer (B) is blending into the core layer a minority amount of ethylene-acrylate copolymer as a processing aid in orientation, in particular, to enable high transverse orientation rates (TDX) similar to that used in BOPP orientation (e.g. 8-10 TDX). Ethylene-acrylates are of the general chemical formula of $CH_2=C(R^1)CO_2R^2$ where $R^1$ can be hydrogen or an alkyl group of 1-8 carbon atoms and $R^2$ is an alkyl group of 1-8 carbon atoms. Ethylene-acrylate copolymers contemplated for this invention can be based on ethylene-acrylate, ethylene-methacrylate, ethylene-n-butyl acrylate-glycidyl methacrylate, ethylene-glycidyl methacrylate, ethylene-butyl-acrylate, ethylene acrylic esters, or blends thereof. Ethylene vinyl acetate (EVA) and ethylene methacrylate (EMA) can also be contemplated. Other similar materials may also be contemplated. As described in U.S. Pat. No. 7,354,973, suitable compositions of the ethylene-acrylate copolymers can be about 20-95 wt % ethylene content copolymerized with about 3-70 wt % n-butyl acrylate and about 0.5-25 wt % glycidyl methacrylate monomers. A particularly suitable ethylene-acrylate copolymer of this type is one produced by E. I. DuPont de Nemours and Company Packaging and Industrial Polymers Biomax® Strong 120. This additive has a density of about 0.94 g/cm$^3$, a melt flow rate of about 12 g/10 minutes at 190° C./2.16 kg weight, a melting point of about 72° C., and a glass transition temperature of about −55° C. Other suitable ethylene-acrylate copolymer impact modifiers commercially available are: Dupont Elvaloy® PTW, Rohm & Haas, Inc. BPM500, and Arkema, Inc. Biostrength® 130.

Suitable amounts of ethylene-acrylate copolymer to be blended in the crystalline PLA-containing core layer is from 2-10 wt % of the core layer, preferably 2-7 wt % and more preferably, 2-4 wt %. At these concentrations, acceptable clarity of the biaxially oriented film is maintained as well as compostability properties. Too much ethylene-acrylate may cause haziness; too little may not enable transverse orientation at 8-10×. Blending into the core layer can be done most economically by dry-blending the respective resin pellets; it is contemplated that more aggressive blending such as melt-compounding via single-screw or twin-screw can result in better dispersion of the ethylene-acrylate copolymer throughout the PLA matrix.

In this embodiment of a 2-layer coextruded multilayer film, the core resin layer can be surface treated on the side opposite the skin layer with either an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide is particularly preferred. This method results in a treated surface that includes nitrogen-bearing functional groups, preferably at least 0.3 atomic % or more, and more preferably, at least 0.5 atomic % or more. This treated core layer is then well suited for subsequent purposes of metallizing, printing, coating, or laminating, the preferably embodiment being for printing.

In this embodiment of a 2-layer laminate film, it is also possible to add optional amounts of migratory slip agents such as fatty amides and/or silicone oils in the core layer to aid further with controlling coefficient of friction (COF) and web handling issues. Suitable types of fatty amides are those such as stearamide or erucamide and similar types, in amounts of 100-1000 ppm of the core. Preferably, stearamide is used at 400-600 ppm of the core layer. A suitable silicone oil that can be used is a low molecular weight oil of 350 centistokes, which blooms to the surface readily at a loading of 400-600 ppm of the core layer. However, if the films of this invention are desired to be used for metallizing or high definition process printing, it is recommended that the use of migratory slip additives be avoided in order to maintain metallized barrier properties and adhesion or to maintain high printing quality in terms of ink adhesion and reduced ink dot gain. In this case, it is recommended that coefficient of friction control and web handling be resolved using inorganic antiblock particles similar to those already described.

The coextruded skin layer (C) is a heat sealable resin layer including an amorphous polylactic acid polymer and a modifying polymer. As described earlier, the amorphous PLA is preferably based on a L-lactide isomer with D-lactide content of greater than 10 wt %. A suitable amorphous PLA to use is Natureworks® Ingeo™ 4060D grade. This resin has a relative viscosity of about 3.25-3.75, $T_g$ of about 52-58° C., melting temperature of approximately 148° C., heat seal initiation temperature of about 93° C., density of about 1.24 g/cm$^3$, a D-lactide content of about 12 wt %, and a maximum residual lactide in the polylactide polymer of about 0.30% as determined by gas chromatography. Molecular weight $M_w$ is about 180,000. The amount to be used in the heat sealable skin layer is about 50-99 wt % of the layer, preferably 70-95 wt %, and more preferably 85-90 wt %. It is also preferred to add an amount of inorganic antiblock to this layer to aid in web-handling, COF control, film winding, and static control, among other properties. Suitable amounts would be about 1000-5000 ppm of the heat sealable resin layer, preferably 3000-5000 ppm.

Preferred types of antiblock are spherical crosslinked silicone polymer such as Toshiba Silicone's Tospearl® grades of polymethlysilsesquioxane of nominal 2.0 and 3.0 µm sizes. Alternatively, sodium aluminum calcium silicates of nominal 3 µm in diameter can also be used (such as Misuzawa Silton® JC-30), but other suitable spherical inorganic antiblocks can be used including polymethylmethacrylate, silicas, and silicates, and ranging in size from 2 µm to 6 µm. Migratory slip agents such as fatty amides or silicone oils can also be optionally added to the heat seal resin layer of types and quantities mentioned previously if lower COF is desired. However, if the films of this invention are desired to be used for metallizing or high definition process printing, it is recommended that the use of migratory slip additives be avoided or minimized in order to maintain metallized barrier properties and metal adhesion or to maintain high printing quality in terms of ink adhesion and reduced ink dot gain.

Suitable modifiers to add to the amorphous PLA heat seal layer (C) for improvement of heat seal initiation are poly (butylene adipate-co-butylene-terephthalate) (PBAT) or polycaprolactone (PCL) or blends thereof. PBAT is an aromatic copolyester based on terephthalic di-acid and is currently sourced from petroleum-based feedstocks (although it is contemplated that eventually, the monomers for PBAT could be sourced from renewable plant-based feedstocks). It has been shown in the literature to be biodegradable and compostable in a micro-organism environment (e.g. compost) with no indication for an environmental risk (i.e. ecotoxicity). PBAT typically has a melting point of about 110-120° C., density of about 1.21, glass transition temperature of about −30° C., a crystallinity of about 20-35%, and a biodegradation mineralization (per 60 days in compost substantially in accordance with ASTM 5336) of 100%. PBAT materials can be obtained commercially from BASF Corporation under the tradename Ecoflex®. In particular, Ecoflex® 7011 grade is preferred with a melting point of about 119° C., melt flow index of about 3.0 g/10 min at 190° C., density of about 1.25-1.27, Shore D hardness of about 32, and Vicat softness of about 91° C. Other PBAT resins may be obtained from DuPont's Biomax® series of resins or Novamont's Origo-bi™ series of resins.

Another suitable modifying resin to improve further the heat seal initiation properties of amorphous PLA is polycaprolactone. PCL is a polyester produced by the ring-opening of e-caprolactone in the presence of aluminum isopropoxide and is currently sourced from petroleum-based monomers. According to the literature, PCL has been shown to undergo hydrolysis and biodegradation by fungi and can be easily enzymatically degraded. PCL typically has a melting temperature of about 65° C., a glass transition temperature of about −61° C., a density of about 1.11, a crystallinity of about 67%, and a biodegradation mineralization (per 60 days in compost substantially in accordance with ASTM 5336) of 100%. PCL can be obtained from Perstorp Specialty Chemicals Group under the tradename CAPA®. In particular, the CAPA® 6000 PCL resin series is preferred, such as CAPA® 6500 (melting point about 58-60° C., mean molecular weight about 50,000, melt flow index about 7 g/10 min at 160° C.); CAPA® 6800 (melting point about 58-60° C., mean molecular weight about 80,000, melt flow index about 3 g/10 min at 160° C.); CAPA® 6FB100 (melting point about 58-60° C., mean molecular weight about 100,000, melt flow index about 4 g/10 min at 190° C.). Particularly preferred is the CAPA® 6500 grade which may be easier to process with amorphous PLA in extrusion equipment than the other grades. PCL can also be obtained from Danimer Scientific LLC grades 28709 and 28710 which have a melting point of about 56-57° C., density of about 1.12, and melt flow rate of about 1.0-1.5 g/10 min at 190° C. Danimer Scientific also can provide a grade that includes a blend of PLA and PCL: Grade 26806 with a bi-modal melting point of about 150° C. and 57° C. (reflective of the PLA/PCL blend), density of about 1.12, and melt flow rate of about 1.9 g/10 min at 190° C.

Suitable amounts of these modifying resins for improving the amorphous PLA heat seal properties are about 1-50 wt % of the heat sealable layer. Preferably, the amount is about 5-30 wt %, and even more preferably, 10-20 wt %. In particular, if PCL is used, preferably the amount used is about 10-20 wt % of the heat sealable layer; if PBAT is used, preferably the amount used is about 10-30 wt % of the heat sealable layer. When using the PBAT additive with the amorphous PLA heat seal resin, it is recommended to use a compatibilizer to improve the dispersion and miscibility of the PBAT in the amorphous PLA; however, this is an optional component. A suitable compatibilizer is BASF Corporation's Joncryl® ADR4368CS styrene acrylic copolymer (molecular weight about 6800 and glass transition temperature of about 54° C.) in an amount of 0.03 wt % to 0.9 wt % of the sealant layer, preferably, 0.15 wt % to 0.45 wt %. It could also be contemplated to use blends of PCL and PBAT in combination with the amorphous PLA to improve heat seal initiation temperature.

The inventive heat sealable resin layer can be coextruded on one side of the core layer, the heat sealable layer having a thickness after biaxial orientation of between 0.5 and 5 μm, preferably between 1.0 and 2.0 μm. The core layer thickness can be of any desired thickness after biaxial orientation, but preferred and useful thicknesses are in the range of 10 μm to 100 μm, preferably 13.5 μm to 25 μm, and even more preferably 15.0 μm-20.0 μm. The coextrusion process includes a multi-layered compositing die, such as a two- or three-layer die. In the case of a 2-layer coextruded film, a two-layer compositing die can be used. In the case of a 3-layer coextruded film, the core layer can be sandwiched between the heat sealable resin layer and a third layer using a three-layer compositing die. One embodiment is to coextrude in only two layers with only the core layer and the blended heat sealable layer coextruded on one side of the core layer. In this case, the core layer side opposite the heat sealable layer can be further modified by adding inorganic antiblock particles into the core layer itself as explained previously and can also be surface-treated via a discharge-treatment method if so desired. In a three-layer coextruded film embodiment, the third layer, on the side of the core layer opposite the inventive heat sealable layer, can also be modified with antiblock particles in lieu of the core layer and also be surface-treated via a discharge-treatment method as desired. The third layer can be composed of any polymer typically compatible with the core layer resin such as a crystalline PLA resin, amorphous PLA resin, or blends thereof. It can also be contemplated to form this third layer the same or similar composition as the heat sealable layer (C) if desired, such that a 2-sided heat sealable film can be made. Typically, selection of this third layer's formulation is to enhance the coextruded film's printability, appearance, metallizability, winding, laminating, sealability, or other useful characteristics. Useful thickness of this third layer after biaxial orientation can be similar to the thicknesses cited for the heat sealable skin layer, preferably 1.0-2.0 μm.

The surface opposite the inventive heat sealable layer can be surface-treated if desired with either a corona-discharge method, flame treatment, atmospheric plasma, or corona discharge in a controlled atmosphere of nitrogen, carbon dioxide, or a mixture thereof that excludes oxygen. The latter treatment method in a mixture of $CO_2$ and $N_2$ only is preferred. This method of discharge treatment results in a treated surface that includes nitrogen-bearing functional groups, preferably 0.3% or more nitrogen in atomic %, and more preferably 0.5% or more nitrogen in atomic %. This discharge-treated surface can then be metallized, printed, coated, or extrusion or adhesive laminated. Preferably, it is printed or metallized, and more preferably, metallized.

If the three-layer coextruded film embodiment is chosen, the third layer may be coextruded with the core layer opposite the inventive heat sealable resin layer, having a thickness after biaxial orientation between 0.5 and 5 µm, preferably between 0.5 and 3 µm, and more preferably between 1.0 and 2.0 µm. A suitable material for this layer is a crystalline PLA or amorphous PLA or blends thereof, as described earlier in the description. If amorphous PLA is used, the same suitable resin grade used in the heat sealable layer may be employed (e.g. Natureworks® 4060D). If crystalline PLA is used, the same suitable grades as used for the core layer may be employed such as Natureworks® 4042D or 4032D, with the 4032D grade preferred in general. Additionally, blends of both crystalline and amorphous PLA may be contemplated for this layer, similar to previously described formulations for the core layer, but not limited to those descriptions. For example, the ratio of amorphous PLA to crystalline PLA for this third skin layer can range from 0-100 wt % amorphous PLA and 100-0 wt % crystalline PLA. In those embodiments in which crystalline PLA is used in the third layer, an amount of ethylene-acrylate copolymer could be used as described previously, in order to ensure the ability to transversely orient this layer at high orientation rates. Suitable amounts of ethylene-acrylate copolymer to use in this skin layer is 2-10 wt %, preferably 2-7 wt % and, more preferably, 3-5 wt %. The use of various blends of amorphous and crystalline PLA in this layer may make it more suitable for printing, metallizing, coating, or laminating, and the exact ratio of the blend can be optimized for these different applications.

This third layer may also advantageously contain an antiblocking agent and/or slip additives for good machinability and a low coefficient of friction in about 0.01-0.5% by weight of the third layer, preferably about 250-1000 ppm. Preferably, non-migratory inorganic slip and/or antiblock additives as described previously should be used to maintain gas barrier properties and metal adhesion if metallizing, or ink wetting and ink adhesion if printing.

The multilayer coextruded film of the invention can be made either by sequential biaxial orientation or simultaneous biaxial orientation, which are well-known processes in the art. In the case of sequential orientation, a 1.5-meter wide sequential orientation film-making line was used. The multilayer coextruded laminate sheet was coextruded at melt temperatures of about 190° C. to 205° C. and cast and pinned—using electrostatic pinning—onto a cooling drum whose surface temperature was controlled between 15° C. and 26° C. to solidify the non-oriented laminate sheet at a casting speed of about 13 mpm. The non-oriented laminate sheet was stretched first in the longitudinal direction at about 60° C. to 70° C. at a stretching ratio of about 2 to about 4 times the original length, preferably about 2.5-3.0 times, using differentially heated and sped rollers and the resulting stretched sheet is heat-set at about 40-50° C. on annealing rollers and cooled at about 30-40° C. on cooling rollers to obtain a uniaxially oriented laminate sheet. The uniaxially oriented laminate sheet is then introduced into a tenter at a linespeed of about 35-45 mpm and preliminarily heated between 65° C. and 75° C., and stretched in the transverse direction at a temperature of about 75-95° C. at a stretching ratio of about 3 to about 10 times, preferably about 4-6 times the original width and then heat-set or annealed at about 90-135° C., and preferably 100-120° C., to reduce internal stresses due to the orientation and minimize shrinkage and give a relatively thermally stable biaxially oriented sheet. TD orientation rates were adjusted by moving the transverse direction rails in or out per specified increments based on the TD infeed rail width settings and width of the incoming machine-direction oriented film. The biaxially oriented film has a total thickness between 10 and 100 µm, preferably between 15 and 30 µm, and most preferably between 17.5 and 20 µm.

After biaxial orientation, the film may optionally be passed through an on-line discharge-treatment system, such as corona, flame, plasma, or corona treatment in a controlled atmosphere as described previously to whatever desired surface energy. Typically useful surface energy can be 36-50 dyne-cm/cm². The film is then wound into a roll form via film winding equipment.

One embodiment is to metallize the discharge-treated surface opposite the heat sealable resin layer. The unmetallized laminate sheet is first wound in a roll. The roll is placed in a vacuum metallizing chamber and the metal is vapor-deposited onto the (optionally, but preferably) discharge-treated metal receiving layer surface. The metal film may include titanium, vanadium, chromium, manganese, iron, cobalt, nickel, copper, zinc, aluminum, gold, or palladium, the preferred being aluminum. Metal oxides can also be contemplated, the preferred being aluminum oxide. The metal layer can have a thickness between 5 and 100 nm, preferably between 20 and 80 nm, more preferably between 30 and 60 nm; and an optical density between 1.5 and 5.0, preferably between 2.0 and 4.0, more preferably between 2.2 and 3.2. The metallized film is then tested for oxygen and moisture gas permeability, optical density, metal adhesion, metal appearance and gloss, heat seal performance, tensile properties, thermal dimensional stability, and can be made into a laminate structure.

Optionally, prior to aluminum deposition within the metallizing vacuum chamber, the film can be pre-treated using a type of sputtering with a copper cathode at a linespeed of about 305 mpm. This treater is typically set up in the low vacuum section of the metallizer where the unwinding roll is located and the film is passed through this treater prior to entering the high vacuum section of the metallizer where the evaporation boats are located. The treater uses high voltage between the anode and cathode to produce free electrons. Oxygen gas is introduced into the treater and the free electrons combine with the oxygen gas to produce oxygen ions. Magnetic fields guide and accelerate the oxygen ions onto the copper cathode target which then emit copper ions. These copper ions are deposited onto the polylactic acid polymer substrate, creating a monolayer of copper, ca. 20 ng/m² (nanogram/sq. meter) thick. The film is then passed into the high vacuum deposition chamber of the metallizer and is metallized using aluminum to a nominal optical density target of 2.4. Optical densities for aluminum deposition can range from 2.0 to 5.0. The metallized rolls were then slit on a film slitter and tested for properties. This process may be beneficial to improve metal adhesion and gas barrier properties further as the copper ion deposition prior to other metal deposition acts as a "primer" for the subsequent metal deposition such as aluminum. This process is described in U.S. patent application Ser. No. 12/542,428 and this reference is incorporated herein in its entirety.

It should be noted that in the case where this in-chamber "treating" method is used, it is preferable that the incoming unmetallized basefilm roll remains untreated from the film-making line such that the basefilm experiences only one exposure to discharge-treatment processes. This will help avoid possible or potential degradation of the substrate's surface which might result in low metal adhesion properties due to a surface layer of low molecular weight degradation material.

This invention will be better understood with reference to the following examples, which are intended to illustrate specific embodiments within the overall scope of the invention.

EXAMPLE 1

A 3-layer coextruded biaxially oriented PLA film was made using sequential orientation on a 1.5 meter wide tenter frame line as described previously, including a core layer (B) formulation of about 85 wt % of the core layer of Natureworks® 4032D crystalline PLA with about 15 wt % of the core layer of Natureworks® 4060D amorphous PLA. The non-sealable layer (A) included about 84.4 wt % crystalline PLA 4032D, 15 wt % amorphous PLA 4060D, and 0.6 wt % of an antiblock masterbatch which, in turn, included 5 wt % of the masterbatch of a nominal 3 µm sodium calcium aluminum silicate (Misuzawa Silton® JC-30) in an amorphous PLA carrier resin (Natureworks® 4060D) such that the concentration of this antiblock in the layer (A) is about 300 ppm. The coextruded heat sealable skin layer (C) is composed substantially of Natureworks® 4060D at about 89 wt % of the sealant layer, 5 wt % of Danimer 28709 PCL resin, and 6 wt % of the JC-30 antiblock masterbatch such that the concentration of antiblock in the layer (C) is about 3000 ppm (0.3 wt %). Thus, the overall effective amount of amorphous PLA 4060D in the layer (C) was about 94.7 wt % due to the 4060D initially added plus the 4060D used as the carrier resin in the antiblock masterbatch.

The total thickness of this film substrate after biaxial orientation was ca. 80 G or 0.8 mil or 20 µm. The thickness of the respective heat sealable resin layer (C) after biaxial orientation was ca. 8 G (2.0 µm). The thickness of the core layer (B) after biaxial orientation was ca. 72 G (17.0 µm). The thickness of the non-sealable skin layer (A) was ca. 4 G (1.0 µm). The skin layers and the core layer were melt coextruded together through a flat die to be cast on a chill drum using an electrostatic pinner. The formed cast sheet was passed through a machine-direction orienter to stretch in the machine direction (MD) at ca. 3.0× stretch ratio in the longitudinal direction. This was followed by transverse direction (TD) stretching at ca. 5× stretch ratio in the tenter oven. The resultant biaxially oriented film was subsequently heat-set and discharge-treated on the skin layer (A)'s surface opposite the heat sealable skin layer (C) via corona treatment. The film was then wound up in roll form.

EXAMPLE 2

Example 1 was repeated except that the sealant layer (C) formulation was changed to about 84 wt % PLA 4060D, 10 wt % Danimer 28709 PCL, and 6 wt % JC-30 antiblock masterbatch. The overall effective amount of amorphous PLA 4060D was about 89.7 wt %.

EXAMPLE 3

Example 1 was repeated except that the sealant layer (C) formulation was changed to about 79 wt % PLA 4060D, 15 wt % Danimer 28709 PCL, and 6 wt % JC-30 antiblock masterbatch. The overall effective amount of amorphous PLA 4060D was about 84.7 wt %.

EXAMPLE 4

Example 2 was repeated except that the sealant layer (C) formulation was changed to Danimer 28710 PCL at 10 wt % in place of the Danimer 28709 PCL.

EXAMPLE 5

Example 4 was repeated except that the sealant layer (C) formulation was changed to about 44 wt % PLA 4060D, 50 wt % Danimer 28710 PCL, and 6 wt % JC-30 antiblock masterbatch. The overall effective amount of amorphous PLA 4060D was about 49.7 wt %.

EXAMPLE 6

Example 2 was repeated except that the sealant layer (C) formulation was changed to Danimer 26806 PCL/PLA blend at 10 wt % in place of the Danimer 28709 PCL.

EXAMPLE 7

Example 6 was repeated except that the sealant layer (C) formulation was changed to about 15 wt % Danimer 26806 PCL/PLA blend, 79 wt % PLA 4060D, and 6 wt % JC-30 antiblock masterbatch. The overall effective amount of 4060D amorphous PLA was about 84.7 wt %.

EXAMPLE 8

Example 1 was repeated except that the sealant layer (C) formulation was changed to about 83.85 wt % PLA 4060D, 10 wt % Ecoflex® 7011 PBAT, 0.15 wt % Joncryl® ADR4368CS, and 6 wt % JC-30 antiblock masterbatch. The overall effective amount of the amorphous PLA 4060D was about 89.55 wt %.

EXAMPLE 9

Example 8 was repeated except that the sealant layer (C) formulation was changed to about 83.70 wt % PLA 4060D, 10 wt % Ecoflex® 7011 PBAT, 0.30 wt % Joncryl® ADR4368CS, and 6 wt % JC-30 antiblock masterbatch. The overall effective amount of the amorphous PLA 4060D was about 89.40 wt %.

EXAMPLE 10

Example 8 was repeated except that the sealant layer (C) formulation was changed to about 83.55 wt % PLA 4060D, 10 wt % Ecoflex® 7011 PBAT, 0.45 wt % Joncryl® ADR4368CS, and 6 wt % JC-30 antiblock masterbatch. The overall effective amount of the amorphous PLA 4060D was about 89.25 wt %.

EXAMPLE 11

Example 8 was repeated except that the sealant layer (C) formulation was changed to about 73.70 wt % PLA 4060D, 20 wt % Ecoflex® 7011 PBAT, 0.30 wt % Joncryl® ADR4368CS, and 6 wt % JC-30 antiblock masterbatch. The overall effective amount of the amorphous PLA 4060D was about 79.40 wt %.

EXAMPLE 12

Example 8 was repeated except that the sealant layer (C) formulation was changed to about 63.70 wt % PLA 4060D, 30 wt % Ecoflex® 7011 PBAT, 0.30 wt % Joncryl® ADR4368CS, and 6 wt % JC-30 antiblock masterbatch. The overall effective amount of the amorphous PLA 4060D was about 69.40 wt %.

COMPARATIVE EXAMPLE 1

Example 1 was repeated except that the sealant layer formulation was charged to about 94 wt % 4060D amorphous PLA and about 6 wt % JC-30 antiblock masterbatch. The overall Effective amount of amorphous PLA was about 99.7 wt %.

These BOPLA films were then tested for heat seal properties over various heat seal temperatures and heat seal initiation temperature (SIT) determined by the temperature at which a minimum of 200 g/in (g/25 mm) was obtained. Haze and gloss were also measured.

The unlaminated properties of the Examples ("Ex") and Comparative Examples ("CEx.") are shown in Tables 1 and 2.

range. Hot tack performance at 250° F. (121° C.) was acceptable. Haze and gloss compared favorably with the control CEx. 1.

Examples 4 and 5 (Ex 4 and Ex 5) added 10 wt % and 50 wt % polycaprolactone Danimer 28710 respectively to the sealant layer (C) and achieved lower SIT compared to CEx. 1 by 13-30° F. (7.2-16.7° C.). Seal strength at 250° F. (121° C.) remained good and comparable to CEx. 1 for an unlaminated film. The higher loadings of polycaprolactone tended to give lower SIT results and thus, a wider seal range. Hot tack

TABLE 1

| Example | Sealant Layer (C) Composition wt %* | | | | | | SIT ° F. (° C.) | Seal Strength @ 250° F. (121° C.) (g/25 mm) | Hot Tack @ 250° F. (121° C.) (g/25 mm) |
|---|---|---|---|---|---|---|---|---|---|
| | PLA4060D (total amount included from antiblock masterbatch) | Danimer 28709 | Danimer 28710 | Danimer 26806 | Ecoflex ® 7011 | Joncryl ® ADR4368CS | | | |
| Ex. 1 | 94.7 | 5 | 0 | 0 | 0 | 0 | 195 (90.6) | 274 | 189 |
| Ex. 2 | 89.7 | 10 | 0 | 0 | 0 | 0 | 180 (82.2) | 249 | 192 |
| Ex. 3 | 84.7 | 15 | 0 | 0 | 0 | 0 | 183 (83.9) | 319 | 222 |
| Ex. 4 | 89.7 | 0 | 10 | 0 | 0 | 0 | 177 (80.6) | 365 | 267 |
| Ex. 5 | 49.7 | 0 | 50 | 0 | 0 | 0 | 170 (76.7) | 289 | 207 |
| Ex. 6 | 89.7 | 0 | 0 | 10 | 0 | 0 | 193 (89.4) | 284 | 232 |
| Ex. 7 | 84.7 | 0 | 0 | 15 | 0 | 0 | 193 (89.4) | 267 | 209 |
| Ex. 8 | 89.55 | 0 | 0 | 0 | 10 | 0.15 | 193 (89.4) | 298 | 168 |
| Ex. 9 | 89.40 | 0 | 0 | 0 | 10 | 0.30 | 190 (87.8) | 285 | 263 |
| Ex. 10 | 89.25 | 0 | 0 | 0 | 10 | 0.45 | 195 (90.6) | 331 | 218 |
| Ex. 11 | 79.40 | 0 | 0 | 0 | 20 | 0.30 | 183 (83.9) | 335 | 232 |
| Ex. 12 | 69.40 | 0 | 0 | 0 | 30 | 0.30 | 185 (85.0) | 301 | 238 |
| CEx. 1 | 99.7 | 0 | 0 | 0 | 0 | 0 | 200 (93.3) | 268 | 236 |

*All compositions include 0.3 wt % JC-30 antiblock

TABLE 2

| Example | Sealant Layer (C) Composition wt % | | | | | | Haze (%) | Gloss A-Side 60° | Gloss C-Side 20° |
|---|---|---|---|---|---|---|---|---|---|
| | PLA4060D | Danimer 28709 | Danimer 28710 | Danimer 26806 | Ecoflex ® 7011 | Joncryl ® ADR4368CS | | | |
| Ex. 1 | 94.7 | 5 | 0 | 0 | 0 | 0 | 8.4 | 87 | 20 |
| Ex. 2 | 89.7 | 10 | 0 | 0 | 0 | 0 | 7.5 | 91 | 30 |
| Ex. 3 | 84.7 | 15 | 0 | 0 | 0 | 0 | 6.0 | 92 | 31 |
| Ex. 4 | 89.7 | 0 | 10 | 0 | 0 | 0 | 5.8 | 97 | 45 |
| Ex. 5 | 49.7 | 0 | 50 | 0 | 0 | 0 | 9.1 | 87 | 21 |
| Ex. 6 | 89.7 | 0 | 0 | 10 | 0 | 0 | 9.7 | 89 | 20 |
| Ex. 7 | 84.7 | 0 | 0 | 15 | 0 | 0 | 7.6 | 89 | 26 |
| Ex. 8 | 89.55 | 0 | 0 | 0 | 10 | 0.15 | 7.4 | 91 | 29 |
| Ex. 9 | 89.40 | 0 | 0 | 0 | 10 | 0.30 | 8.2 | 94 | 34 |
| Ex. 10 | 89.25 | 0 | 0 | 0 | 10 | 0.45 | 9.4 | 95 | 34 |
| Ex. 11 | 79.40 | 0 | 0 | 0 | 20 | 0.30 | 6.9 | 94 | 41 |
| Ex. 12 | 69.40 | 0 | 0 | 0 | 30 | 0.30 | 7.6 | 98 | 24 |
| CEx. 1 | 99.7 | 0 | 0 | 0 | 0 | 0 | 8.9 | 92 | 18 |

* All compositions include 0.3 wt % JC-30 antiblock

As Table 1 shows, Comparative Example 1 (CEx 1), which is a control film using a biaxially oriented PLA film with a nearly 100 wt % amorphous PLA sealant layer (C) showed the highest SIT at 200° F. (93.3° C.) to obtain 200 g/25 mm seal strength. Seal strength at 250° F. (121° C.) was good at 268 g/25 mm for an unlaminated film. Hot tack performance at 250° F. (121° C.) was acceptable. Haze and gloss of both the (A) and (C) layer surfaces were also measured as a benchmark.

Examples 1, 2, and 3 (Ex 1 to Ex 3) added 5 wt %, 10 wt %, and 15 wt % polycaprolactone Danimer 28709 respectively to the sealant layer (C) and achieved lower SIT compared to CEx. 1 by 5-20° F. (2.8-11.1° C.). Seal strength at 250° F. (121° C.) remained good and comparable to CEx. 1 for an unlaminated film. The higher loadings of polycaprolactone tended to give lower SIT results and thus, a broader seal performance at 250° F. (121° C.) was acceptable. Haze and gloss were comparable to the control CEx. 1.

Examples 6 and 7 (Ex 6 and Ex 7) added 10 wt % and 15 wt % of a polycaprolactone/PLA melt-compounded blend Danimer 26806 respectively to the sealant layer (C) and achieved lower SIT compared to CEx. 1 by 7° F. (3.9° C.). Seal strength at 250° F. (121° C.) remained good and comparable to CEx. 1 for an unlaminated film. The polycaprolactone/PLA blend was not as efficient as using neat polycaprolactone resin in reducing SIT, perhaps due to dilution of the PCL. Hot tack performance at 250° F. (121° C.) was acceptable. Haze and gloss were comparable to the control CEx. 1.

Examples 8 to 12 (Ex 8 to Ex 12) added 10 wt %, 20 wt %, and 30 wt % PBAT Ecoflex® 7011 with varying amounts of Joncryl® styrene acrylic compatibilizer, respectively, to the sealant layer (C), which effectively lowered SIT by 5-17° F.

(2.8-9.4° C.) when compared to CEx. 1. Seal strength at 250° F. (121° C.) remained good and comparable to CEx. 1 for an unlaminated film. The PBAT blends appeared to require higher amounts than the PCL blends to achieve the same amount of SIT reduction. Hot tack performance at 250° F. (121° C.) was acceptable. Haze and gloss were comparable or were favorable to the control CEx. 1.

In conclusion, the use of polycaptolactone or poly(butylene-adipate-co-butylene terephthalate) resins to amorphous PLA can significantly lower the seal initiation properties and broaden the heat seal range without affecting overall heat seal strength performance. Hot tack properties are similarly maintained with the use of these additives. Optical appearance of the Examples also compared similarly to the Comparative Example.

Test Methods

The various properties in the above examples were measured by the following methods:

Transparency of the film was measured by measuring the haze of a single sheet of film using a hazemeter model like a BYK Gardner "Haze-Gard Plus®" substantially in accordance with ASTM D1003. Preferred values for haze was about 10% or less for a transparent film for metallizing.

Gloss of the film was measured by measuring the desired side of a single sheet of film via a surface reflectivity gloss meter (BYK Gardner Micro-Gloss) substantially in accordance with ASTM D2457. The A-side or non-sealable layer side was measured at a 60° angle; the C-side or sealant layer side was measured at a 20° angle. Preferred value for A-side gloss was greater than 85% for a glossy appearance. Preferred value for C-side gloss was to be equal to or greater than the gloss value for CEx. 1

Light transmission of the film was measured by measuring light transmission of a single sheet of film via a light transmission meter (BYK Gardner Haze-Gard Plus) substantially in accordance with ASTM D1003.

Heat seal strength: Measured by using a Sentinel sealer model 12 ASL at 30 psi (133.4 N), 0.5 second dwell time, with heated flat upper seal jaw Teflon coated, and unheated lower seal jaw, rubber with glass cloth-covered. The film is heat-sealed sealant-side to sealant-side at the desired seal temperature range and increments in the Sentinel sealer (e.g. 170-290° F. at 10° F. increments (76.7-143.3° C. at 5.6° C. increments)) and then the respective seal strengths are measured using an Instron model 4201 tensile tester. The heat-sealed samples are cut into 1-inch wide strips, the two unsealed tails are placed in the upper and lower Instron clamps and the sealed tail supported at a 90° angle to the two unsealed tails for a 90° T-peel test. The peak and average seal strength is recorded. The preferred values for acceptable heat seal strength is 200 g/25 mm or greater at 250° F. (121° C.) seal temperature.

Hot tack strength: Measured by using a Lako Tool hot tack/sealer model SL10 at 30 psi (133.4 N), 0.5 second dwell time, with heated flat lower seal jaw Teflon coated, and unheated upper seal jaw and with delay set to 0 seconds. The film sample is cut into a strip 13 inches long by 1 inch wide and fitted into the Lako SL10 film holder. The film is then heat-sealed sealant-side to sealant-side at the desired seal temperature range and increments in the Lako sealer (e.g. 170-290° F. at 10° F. increments (76.7-143.3° C. at 5.6° C. increments)) and then the respective hot tack strengths are measured by the Lako SL10 sealer automatically. The peak hot tack strength is recorded. The preferred values for acceptable hot tack is 150 g/25 mm or greater at 250° F. (121° C.) seal temperature.

Heat seal and hot tack seal initiation temperature (SIT): Measured by using the above methods (A) and (B) using the Sentinel 12 ASL or Lako Tool SL10 hot tack sealer. Heat seal initiation temperature is the lowest temperature at which minimum 200 g/25 mm seal strength is achieved. Hot tack initiation temperature is the lowest temperature at which minimum 150 g/25 mm hot tack is achieved. Initiation temperatures of less than 200° F. (93.3° C.) are preferred.

Compostability or biodegradability was measured using conditions substantially in accordance with ASTM D6400-99 "Compostable Plastics" and D6002-99 at 58° C. in a compost medium for 180 days. The plastic specimen is considered compostable if it degrades completely within 180 days. The preferred time is within 105 days.

Transverse orientation obtained was measured by varying the stretching and outlet zones' chain rail widths in relation to the in-feed rail settings of the transverse direction orientation (TDO) oven section. The comparison in width between inlet and stretch was used to calculate TD orientation ratio obtained.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A biaxially oriented film comprising:
   a core layer consisting essentially of polylactic acid base polymer resin; and
   a heat sealable layer comprising amorphous polylactic acid base polymer and a modifier comprising polycaprolactone or poly(butylene-adipate-co-butylene terephthalate),
   wherein the amorphous polylactic acid base polymer has a peak melting point and the film has a heat seal strength of 200-365 g/25 mm at 250° F.

2. The biaxially oriented film of claim 1, wherein the heat sealable layer comprises at least 50 wt % amorphous polylactic acid base polymer.

3. The biaxially oriented film of claim 1, wherein the modifier comprises polycaprolactone and poly(butylene-adipate-co-butylene terephthalate).

4. The biaxially oriented film of claim 1, wherein the core layer comprises crystalline polylactic acid base polymer resin.

5. The biaxially oriented film of claim 1, wherein the core layer comprises 2-10 wt % ethylene-acrylate copolymer.

6. The biaxially oriented film of claim 1, further comprising a skin layer comprising a polylactic acid base polymer resin on a side of the core layer opposite the heat sealable layer.

7. The biaxially oriented film of claim 6, wherein the skin layer is a printing ink receiving layer, a metal receiving layer or a coating receiving layer.

8. The biaxially oriented film of claim 6, wherein the skin layer has the same composition as the heat sealable layer.

9. The biaxially oriented film of claim 1, wherein the film is oriented in the transverse direction at least 8.0x.

10. The biaxially oriented film of claim 1, wherein the heat sealable layer comprises less than 50 wt % modifier.

11. The biaxially oriented film of claim 10, wherein the heat sealable layer comprises 10-20 wt % modifier.

12. A biaxially oriented film comprising:
a core layer consisting essentially of polylactic acid base polymer resin; and
a heat sealable layer comprising amorphous polylactic acid base polymer and a modifier, wherein the modifier reduces the seal initiation temperature by at least 5° F. (2.8° F.) compared to the heat sealable layer without the modifier, and wherein the heat sealable layer maintains compostability per ASTM D6400-99 in less than 180 days,
wherein the amorphous polylactic acid base polymer has a peak melting point and the film has a heat seal strength of 200-365 g/25 mm at 250° F.

13. The biaxially oriented film of claim 12, wherein the heat sealable layer comprises polycaprolactone or poly(butylene-adipate-co-butylene terephthalate).

14. The biaxially oriented film of claim 12, wherein the heat sealable layer comprises at least 50 wt % amorphous polylactic acid base polymer.

15. The biaxially oriented film of claim 12, wherein the core layer comprises crystalline polylactic acid base polymer resin.

16. The biaxially oriented film of claim 12, wherein the film is oriented in the transverse direction at least 8.0x.

17. The biaxially oriented film of claim 12, wherein the heat sealable layer comprises less than 50 wt % modifier.

18. The biaxially oriented film of claim 17, wherein the heat sealable layer comprises 10-20 wt % modifier.

19. A method of making a multilayer film comprising:
co-extruding a film comprising a core layer consisting essentially of polylactic acid base polymer, and a heat sealable layer comprising amorphous polylactic acid base polymer and a modifier comprising polycaprolactone or poly(butylene-adipate-co-butylene terephthalate); and
biaxially orienting the film,
wherein the amorphous polylactic acid base polymer has a peak melting point and the film has a heat seal strength of 200-365 g/25 mm at 250° F.

20. The method of claim 19, wherein the heat sealable layer comprises at least 50 wt % amorphous polylactic acid base polymer.

21. The method of claim 19, wherein the modifier comprises polycaprolactone and poly(butylene-adipate-co-butylene terephthalate).

22. The method of claim 19, wherein the core layer comprises crystalline polylactic acid base polymer resin.

23. The method of claim 19, wherein the core layer comprises 2-10 wt % ethylene-acrylate copolymer.

24. The method of claim 19, further comprising a skin layer comprising a polylactic acid base polymer resin on a side of the core layer opposite the heat sealable layer.

25. The method of claim 24, wherein the skin layer is a printing ink receiving layer, a metal receiving layer or a coating receiving layer.

26. The method of claim 24, wherein the skin layer has the same composition as the heat sealable layer.

27. The method of claim 19, wherein the film is oriented in the transverse direction at least 8.0x.

28. The method of claim 19, wherein the heat sealable layer comprises less than 50 wt % modifier.

29. The method of claim 28, wherein the heat sealable layer comprises 10-20 wt % modifier.

* * * * *